United States Patent

Factor

[15] 3,673,146

[45] June 27, 1972

[54] METHOD FOR STABILIZING PIGMENTED POLYCARBONATE RESINS

[72] Inventor: Arnold Factor, Scotia, N.Y.

[73] Assignee: General Electric Company

[22] Filed: Feb. 24, 1971

[21] Appl. No.: 118,577

[52] U.S. Cl. .................................... 260/37 PC, 260/29.1 SB
[51] Int. Cl. ........................................................... C08g 51/04
[58] Field of Search ..................... 260/37 PC, 29.1 SB, 824 R

[56] References Cited

UNITED STATES PATENTS 3,087,908   4/1963   Caird............................260/824 R UX

FOREIGN PATENTS OR APPLICATIONS 1,124,241   2/1962   Germany............................260/824 R Primary Examiner—Lewis T. Jacobs
Attorney—Frank L. Neuhauser, Oscar B. Waddell and Joseph B. Forman

[57] ABSTRACT

A method is provided for stabilizing polycarbonate resin tinted with ultramarine pigment, involving the incorporation of the ultramarine pigment into the polycarbonate resin as an arylsiloxane-pigment blend. There also is employed with the arylsiloxane-pigment blend, polycarbonate resin stabilizers such as triorganophosphite, and a cyclo aliphatic epoxy compound. The stabilized resin can be remolded without a significant increase in the Yellow Index of the resin.

4 Claims, No Drawings

METHOD FOR STABILIZING PIGMENTED POLYCARBONATE RESINS

The present invention relates to a method of stabilizing the color of pigmented polycarbonate resin involving the treatment of the pigment with an arylsiloxane prior to its incorporation into the resin.

Polycarbonate resins have long been recognized as superior plastics in view of their high impact strength and ease of moldability to finished parts. When initially manufactured polycarbonates are generally crystal clear, but have a tendency to yellow when molded at temperatures above about 500° F. The resin is further degraded and rendered less useful when reground for further use. Various methods have been used to minimize the yellowing tendency of polycarbonate resins. For example, as shown in U.S. Pat. No. 3,489,716, Calkins, assigned to the same assignee as the present invention, a cyclo aliphatic epoxy compound, such as 3,4-epoxycyclohexylmethyl-3,4-epoxycyclohexane-carboxylate has been found to be a valuable stabilizer for polycarbonate resins. Another stabilizer which has been employed is shown by Fritz et al., U.S. Pat. No. 3,305,520, utilizing triorganophosphite. The combination of the aforementioned cycloaliphatic epoxy compound, and the triorganophosphite has been found to further improve the ability of the resin to resist change in color during molding. In certain instances, fabricators find it desirable to employ a pigment such as ultramarine to further mask the yellowness of the polycarbonate resin developed during regrind and subsequent moldings, while tinting the resin in a suitable manner. Experience has shown that when ultramarine pigment, which hereinafter will signify either ultramarine blue, or a mixture of ultramarine blue and ultramarine violet, is employed in combination with the aforementioned polycarbonate resin stabilizers, optimum resin color, as determined by Yellow Index (YI) value in accordance with ASTM Yellow Index Test D1925–63T is often not achieved. One explanation advanced as to why optimum results are not achieved with the ultramarine pigment-polycarbonate resin stabilizer combination, is that undesirable by-products are produced during the molding of the resin which can raise the YI value of the resin upon molding and regrind.

The present invention is based on the discovery that certain polycarbonate resin compatible arylsiloxanes can be advantageously employed to reduce the yellowing tendency of the polycarbonate resin if incorporated into the resin with the ultramarine pigment as a preformed mixture. The aforementioned resin stabilizers can be employed in combination with such arylsiloxane-pigment mixture to provide for moldable polycarbonates having a minimum YI value build up after regrinding. This result is quite surprising, particularly in view of the fact that optimum results are not achieved if the pigment and arylsiloxane are separately employed with the polycarbonate resin.

In a method for stabilizing polycarbonate resin involving the employment of cycloaliphatic epoxy compound, triorganophosphite and up to 0.1 percent by weight of the resin of ultramarine pigment, there is provided by the present invention the improvement of incorporating the ultramarine pigment into the polycarbonate resin as an arylsiloxane-pigment blend, having from 1 to 20 percent of ultramarine pigment based on the weight of the blend.

Among the arylsiloxane which can be employed in the practice of the invention, are fluids included by the formula, (1) 

where R is a monovalent aryl radical, R′ is a monovalent hydrocarbon radical selected from R radicals and alkyl radicals, and $a$ has an average value of from 0.25 to 3, inclusive, $b$ has an average value of from 0 to 2 inclusive, and $a+b$ has an average value of from 1 to 3 inclusive.

Included by the arylsiloxanes which can be employed in the practice of the invention, are organopolysiloxanes having chemically-combined $RSiO_{1.5}$ units, such as $C_6H_5SiO_{0.5}$, and chemically-combined alkylsiloxy units such as $(CH_3)_3SiO_{0.5}$. There are included by R, aryl radicals such as phenyl, tolyl, xylyl. Radicals included by R′ in addition to R radicals are, for example, alkyl radicals such as methyl, ethyl, propyl, etc. Methods for making such arylsiloxanes are well known, and include for example, the co-hydrolysis of organo halosilane mixtures such as phenyltrichlorosilane and trimethylchlorosilane. In addition, cycloarylsiloxane and arylsilanols also can be employed such as octaphenylcyclotetrasiloxane, diphenylsilanediol, 1,3-tetraphenyldisiloxanediol, etc.

Included by the cycloaliphatic epoxy compounds are 3,4-epoxycyclohexylmethyl-3,4-epoxycyclohexane carboxylate, 3,4-epoxy-6-methylcyclohexylmethyl-3,4-epoxy-6-methylcyclohexane carboxylate, 2,3-epoxycyclohexylmethyl-3,4-epoxycyclohexane carboxylate, 4-(3,4-epoxy-5-methylcyclohexyl) butyl-3,4-epoxycyclohexane carboxylate, 3,4-epoxycyclohexylethylene oxide, di-3,4-epoxy-6-methylcyclohexylmethyl adipate, cyclohexylmethyl-3,4-epoxycyclohexane carboxylate and 3,4-epoxy-6-methylcyclohexyl-methyl-6-methylcyclohexyl carboxylate. The cycloaliphatic epoxy compounds can contain anywhere from six up to 30 carbon atoms. The preferred cycloaliphatic epoxy compound is 3,4-epoxycyclohexylmethyl-3,4-epoxy-cyclohexane carboxylate.

The triorganophosphites which can be employed in the practice of the invention are trialkyl phosphite, for example, tridecyl phosphite, mixed alkyl aryl phosphite such as phenyldidecylphosite. Additional examples are shown in the above identified Fritz et al patent.

The ultramarine pigment which can be employed in the practice of the invention is well known and is essentially a sodium aluminum silicate, included among the sodium zeolites. When employed at from 0.001 to 0.01 percent by weight of resin, it serves to mask the yellowness of the resin without substantially altering the color of the resin. The ultramarine pigment can be made by igniting a mixture of Kaolin, sodium carbonate, or sodium sulphate, sulfur and carbon. A form of the ultramarine pigment can be represented by the formula $Na_{6.3}[Al_{4.79}Si_{7.21}O_{24}]S_{3.74}$.

The polycarbonates which can be employed in the practice of the present invention are any aromatic polycarbonates generally made by the reaction of a dihydric phenol and a carbonyl halide. Some of the dihydric phenols which can be employed are, for example, 1,1-bis(4-hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, etc., dihydric phenol ethers such as bis(4-hydroxyphenyl)-ether, bis(3,5-dichloro-4-hydroxyphenyl)-ether, etc., dihydroxy diphenyls such as p,p′-dihydroxydiphenyl, 3,3′-dichloro-4,4′-dihydroxydiphenyl, etc., dihydroxyaryl sulfones such as bis(4-hydroxyphenyl)-sulfone, bis(3,5-dimethyl-4-hydroxyphenyl)-sulfone, bis(3-methyl-5-ethyl-4-hydroxyphenyl)-sulfone, etc., dihydroxy benzenes, resorcinol, hydroquinone, halo and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-dihydroxyphenyl)-sulfoxide, bis-(3,5-dibromo-4-hydroxyphenyl)-sulfoxide, etc. A variety of additional dihydric phenols are also available to provide carbonate polymers and are disclosed in U. S. Pat. Nos. 2,999,835, 3,028,365, and 3,153,008. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the polycarbonates employed in this invention. Carbonyl halides which can be utilized are, for example, carbonyl chloride, as well as carbonate esters and halo formates. The carbonyl halides which can be employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinone, etc.) or glycols (bishalo-formates of ethylene glycol, neopentyl glycol, polyethylene glycol, etc.). While other carbonate precursors will occur to those skilled in the art, carbonyl chloride, also known as phosgene, is preferred.

In the practice of the method of the present invention, the ultramarine pigment is incorporated into the polycarbonate resin in the form of an arylsiloxane-ultramarine pigment blend. The order of addition of the triorganophosphite and the cyclo aliphatic epoxy compound referred hereinafter as the epoxy compound, is not critical. The resulting blend after being thoroughly agitated to fully disperse the additives throughout the resin, can be melt-extruded at temperatures up to about 650° F.

The mixing of the ultramarine pigment and the arylsiloxane can be readily achieved by standard means, such as a Waring Blender, paint mill, etc., utilizing a proportion of from about 5 to 100 parts of arylsiloxane, per part of pigment. The triorganophosphite can be employed at from 0.01 to 0.1 percent by weight of resin, and preferably is employed in combination with the epoxy compound in the form of a mixture of from 5 to 15 moles of epoxy compound, per mole of triorganophosphite.

In order that those skilled in the art will be better able to practice the invention, the following examples are given by way of illustration, and not by way of limitation. All parts are by weight.

EXAMPLE 1

A series of blends are prepared from a polycarbonate resin and various resin stabilizers, to determine the ability of the stabilized resin to resist yellowing as a result of being molded and reground and remolded at temperatures of from 550° – 650° F. A commercially available polycarbonate resin is employed having an intrinsic viscosity of about 0.5 dl/g in methylene chloride at 25° C, which is the product of reaction of phosgene and 2,2-bis(4-hydroxyphenyl)-propane. The change in color is determined by measuring the Yellowness Index (YI) of the resin in accordance with ASTM-1925-63T. Test samples are prepared in the form of molded chips. The chips are prepared by extruding pellets at about 600° F of the powdered resin, or powdered blend of the resin and stabilizers, and then molding the pellets at temperatures in the range of 550° – 650° F. In preparing the blends, there is employed, based on the weight of powdered resin, 0.01 percent of ultramarine pigment, 0.1 percent of a mixture of phenyldidecylphosphite, and from 10 to 15 moles, per mole of triorganophosphite of 3,4-epoxy-cyclohexylmethyl-3,4-epoxy-cyclohexane carboxylate, and 0.35 percent by weight of a methylphenylsiloxane having an average of five chemically combined trimethylsiloxy units, per three chemically combined phenylsiloxy units.

Polycarbonate resin chip A is made free of any additive. Polycarbonate resin chip B is prepared containing only ultramarine pigment. A mixture of pigment and the methylphenylsiloxane is employed with the polycarbonate resin to produce chip C. Chip D contains pigment and the triorganophosphite-epoxy compound mixture. Chips E, F, and G, are prepared from blends of polycarbonate resin, pigment, methylphenylsiloxane, and the triorganophosphite-epoxy compound mixture. In chip E, the various ingredients are added separately to the resin in a random manner. In chip F, the pigment is added to a blend of the methylphenylsiloxane, and the triorganophosphite-epoxy compound mixture. In preparing chip G, the pigment is added to the resin as a pigment-methylphenylsiloxane slurry. The YI of the chips are determined in accordance with ASTM-1925-63T.

The following table shows the initial YI of the chips after being molded at 600° F. Values are also shown for the chips after being chopped down and remolded at 600° F two additional times.

Y I VALUES

| Chip | 1st molding | 2nd molding | 3rd molding |
|------|-------------|-------------|-------------|
| A | 4.1 | 5.8 | 6.8 |
| B | 3.6 | 4.8 | 5.6 |
| C | 2.5 | 3.4 | 4.0 |
| D | 1.3 | 1.9 | 3.1 |
| E | 1.0 | 2.0 | 2.0 |
| F | 0.5 | 1.6 | 2.2 |
| G | 0.6 | 1.0 | 1.6 |

The above table shows the significant difference between the performance of the unstabilized polycarbonate resin, chip A, the resin stabilized in accordance with the prior art, chips C and D, and the resin stabilized in accordance with the invention, chip G. Chips E and F show improved results after the first molding, but their Yellow Index is significantly higher after the second and third moldings, compared to chip G. It also was found that significantly improved results were obtained with chips F and G after the first molding at temperatures of 550° and 650° F, compared to chips A – E. The unexpected results of the invention are clearly shown when chips F and G are compared after the second and third molding with respect to the ability of chip G made in accordance with the method of the present invention, to resist yellowing after successive regrinding.

Although the above example is limited to only a few of the arylpolysiloxane materials which can be employed in the practice of the method of the present invention, it should be understood that the present invention can be utilized with arylsiloxane as shown in Formula 1, and applicable to a much broader variety of polycarbonate resins.

We claim:

1. In a method for stabilizing polycarbonate resin involving the employment of a triorganophosphite, cycloaliphatic epoxy compound and up to 0.1 percent based on the weight of polycarbonate resin of ultramarine pigment, the improvement of incorporating the ultramarine pigment into the polycarbonate resin as an ultramarine pigment-aryl siloxane mixture having from 1 to 20 percent of ultramarine pigment based on the weight of the mixture, where the aryl siloxane is a fluid included by the formula,

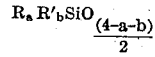

where R is a monovalent aryl radical, R' is a monovalent hydrocarbon radical selected from R radicals and alkyl radicals, and $a$ has an average value of from 0.25 to 3, inclusive, $b$ has an average value of from 0 to 2 inclusive, and $a+b$ has an average value of from 1 to 3 inclusive.

2. The method in accordance with claim 1, where arylsiloxane is a methylphenylpolysiloxane.

3. The method in accordance with claim 2, where the arylsiloxane consists essentially of chemically combined phenylsiloxy units and trimethylsiloxy units.

4. A method for stabilizing polycarbonate resin in accordance with claim 1, utilizing phenyldidecylphosphite, 3,4-epoxycyclohexymethyl-3,4-epoxy-cyclohexane carboxylate, ultramarine pigment and a methylphenylsiloxane.

* * * * *